United States Patent [19]
Weddle

[11] Patent Number: 5,918,808
[45] Date of Patent: Jul. 6, 1999

[54] APPARATUS AND METHOD FOR LOADING CHEMICALS INTO A STORAGE TANK OF A CROP SPRAYER

[75] Inventor: Kenneth E. Weddle, Trafalgar, Ind.

[73] Assignee: Equipment Technologies, LLC, Indianapolis, Ind.

[21] Appl. No.: 09/050,455

[22] Filed: Mar. 30, 1998

[51] Int. Cl.$^6$ .............................. B05B 9/00; A01G 25/09
[52] U.S. Cl. .............................. 239/1; 239/148; 239/159; 239/172
[58] Field of Search .............................. 239/1, 146, 147, 239/148, 159, 172

[56] References Cited

U.S. PATENT DOCUMENTS

| 3,858,761 | 1/1975 | O'Dell . |
| 3,976,087 | 8/1976 | Bolton et al. . |
| 4,274,585 | 6/1981 | Lestradet . |
| 4,650,124 | 3/1987 | Connaughty et al. . |
| 4,714,196 | 12/1987 | McEachern et al. .................... 239/159 |
| 5,004,155 | 4/1991 | Dashevsky . |
| 5,125,576 | 6/1992 | Ziegenbein . |
| 5,165,600 | 11/1992 | Holter ................................. 239/148 X |
| 5,180,108 | 1/1993 | Miyamoto ................................. 239/172 |

OTHER PUBLICATIONS

Marketing brochure entitled "Sneak Preview of the New 544 Rogator", from ag–chem Equipment Co., Inc.

Primary Examiner—Andres Kashnikow
Assistant Examiner—Robin O. Evans
Attorney, Agent, or Firm—Maginot, Addison & Moore

[57] ABSTRACT

A crop sprayer having a chassis and a number of wheels which support the chassis is disclosed. The crop sprayer further includes an engine for driving at least one of the number of wheels so as to propel the chassis, and a storage tank, supported by the chassis, for storing a quantity of water therein. The crop still sprayer further includes a chemical receptacle, supported by the chassis, for receiving and holding a chemical solution therein. The crop sprayer yet further includes a first loading conduit which is in fluid communication with the chemical receptacle, a second loading conduit which is in fluid communication with the storage tank, and an electric pump having a pump inlet and a pump outlet. The pump inlet is coupled to the first loading conduit. The pump outlet is coupled to the second loading conduit. Operation of the electric pump causes the chemical solution to be advanced from the chemical receptacle to the storage tank through the first loading conduit and the second loading conduit, whereby the chemical solution becomes commingled with the water in the storage tank so as to create a diluted chemical solution in the storage tank. The crop sprayer still further includes a battery electrically coupled to the electric pump for powering the electric pump, a sprayer conduit in fluid communication with the storage tank, and a sprayer pump for causing the diluted chemical solution to be advanced out of the storage tank through the sprayer conduit and onto a field.

10 Claims, 8 Drawing Sheets

APPARATUS AND METHOD FOR LOADING CHEMICALS INTO A STORAGE TANK OF A CROP SPRAYER

TECHNICAL FIELD OF THE INVENTION

The present invention relates generally to a crop sprayer, and more particularly to an apparatus and method for loading chemicals into a storage tank of a crop sprayer.

BACKGROUND OF THE INVENTION

A crop sprayer is used to distribute chemicals, such as herbicides, pesticides, and fertilizers, over crops in a field during a spraying operation. The chemicals are held in a storage tank prior to being sprayed upon the field.

In order to reduce bulk and weight of the chemicals, the chemicals are shipped from the manufacturer as concentrated chemicals. The concentrated chemicals must be diluted with water prior to being sprayed upon the field. To dilute the concentrated chemicals, the concentrated chemicals are loaded into the storage tank that has been partially filled with water.

One manner of loading the concentrated chemicals into the storage tank is for the operator of the crop sprayer to climb on the crop sprayer and pour the concentrated chemicals into an opening defined in the top of the storage tank thereby disadvantageously inconveniencing the operator.

One alternative to the above loading approach is use a venturi system which draws or otherwise sucks the concentrated chemicals from a loading receptacle to the storage tank. The venturi system functions by advancing a quantity of water from an auxiliary water tank through venturi tubing so as to generate a partial vacuum which is used to draw the concentrated chemicals from the loading receptacle into the storage tank. One crop sprayer which utilizes such a venturi system is available from AgChem Equipment Co., Inc. of Minnetonka, Minn. as model no. 544. This particular crop sprayer is sold under the trademark "Rogator".

One disadvantage of using the above venturi-type loading system is that a high velocity flow of water must be generated in order to create a partial vacuum of sufficient magnitude which is capable of drawing the concentrated chemicals from their respective chemical receptacle. This high velocity flow of water in the venturi system has been known on occasion to accidentally become partially diverted during a chemical loading process whereby a violent backflow of concentrated chemicals is forced out of a drain of the chemical receptacle. Such a backflow situation is dangerous since the concentrated chemical may be sprayed upwardly out of the chemical receptacle and come into contact with the crop sprayer operator or other bystanders. In addition, if the concentrated chemicals are sprayed upwardly out of the chemical receptacle, the environment at the loading site may be exposed to these chemicals at a potentially harmful concentration level.

Another disadvantage of using the above venturi-type loading system is that the high velocity flow of water which is present in the system is generated by a hydraulically powered water source. Such a hydraulically powered water source requires a flow of pressurized hydraulic fluid to be supplied thereto in order to enable its operation. This flow of pressurized hydraulic fluid is supplied to the water source by a high capacity hydraulic fluid source. This high capacity hydraulic fluid source is a common hydraulic fluid source of the crop sprayer which supplies pressurized hydraulic fluid to the various subsystems of the crop sprayer such as a hydraulic boom arm manipulation system. In order to generate the required hydraulic pressure within this high capacity hydraulic fluid source, the high capacity hydraulic fluid source is generally coupled to a crankshaft of an internal combustion engine which is carried on or otherwise supported by the crop sprayer. In order to rotate the crankshaft of the internal combustion engine so as to create the required hydraulic pressure within the high capacity hydraulic fluid source, the internal combustion engine must be operating or otherwise in a running mode. Operating the engine during a chemical loading operation consumes fuel and creates a noisy environment which may be unpleasant for the crop sprayer operator or other bystanders. Furthermore, operation of the internal combustion engine may require that the crop sprayer operator use controls remote from the chemical receptacle which may be inconvenient for the crop sprayer operator. In particular, the operator may be required to operate a number of controls located in a cab of the crop sprayer in order to facilitate operation of the crop sprayer's engine thereby causing the operator to make a number of trips between the cab and the chemical receptacle.

Still another disadvantage of using the above venturi-type loading system is that such a loading system is relatively complicated and expensive.

What is needed therefore is an apparatus and method for loading the concentrated chemicals into the storage tank of a crop sprayer which overcomes one or more of the above-mentioned disadvantages.

SUMMARY OF THE INVENTION

In accordance with a first embodiment of the present invention, there is provided a crop sprayer. The crop sprayer includes a chassis, a number of wheels which support the chassis, an engine for driving at least one of the number of wheels so as to propel the chassis, and a storage tank, supported by the chassis, for storing a quantity of water therein. The crop sprayer further includes a chemical receptacle, supported by the chassis, for receiving and holding a chemical solution therein. The crop sprayer still further includes a first loading conduit which is in fluid communication with the chemical receptacle, a second loading conduit which is in fluid communication with the storage tank, and an electric pump having a pump inlet and a pump outlet. The pump inlet is coupled to the first loading conduit. The pump outlet is coupled to the second loading conduit. Operation of the electric pump causes the chemical solution to be advanced from the chemical receptacle to the storage tank through the first loading conduit and the second loading conduit, whereby the chemical solution becomes commingled with the water in the storage tank so as to create a diluted chemical solution in the storage tank. The crop sprayer further includes a battery electrically coupled to the electric pump for powering the electric pump, a sprayer conduit in fluid communication with the storage tank, and a sprayer pump for causing the diluted chemical solution to be advanced out of the storage tank through the sprayer conduit and onto a field.

In accordance with a second embodiment of the present invention there is provided a method of operating a crop sprayer. The crop sprayer includes a chassis, a number of wheels which support the chassis, an engine for driving at least one of the number of wheels so as to propel the chassis, a storage tank supported by the chassis, a chemical receptacle supported by the chassis, a first loading conduit which is in fluid communication with the chemical receptacle, a second loading conduit which is in fluid communication with the storage tank, an electric pump having a pump inlet and a pump outlet, wherein the pump inlet is coupled to the first loading conduit, and the pump outlet is coupled to the second loading conduit, a sprayer conduit in fluid communication with the storage tank, and a sprayer pump in fluid communication with the sprayer conduit. The method includes the steps of placing a quantity of water into the storage tank and placing a chemical solution into the chemical receptacle. The method further includes the step of operating the electric pump so as to cause the chemical solution to be advanced from the chemical receptacle to the storage tank through the first loading conduit and the second loading conduit, whereby the chemical solution becomes commingled with the water in the storage tank so as to create a diluted chemical solution in the storage tank. The method yet further includes the steps of powering the electric pump with a battery during the electric pump operating step and operating the sprayer pump so as to cause the diluted chemical solution to be advanced out of the storage tank through the sprayer conduit and onto a field.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
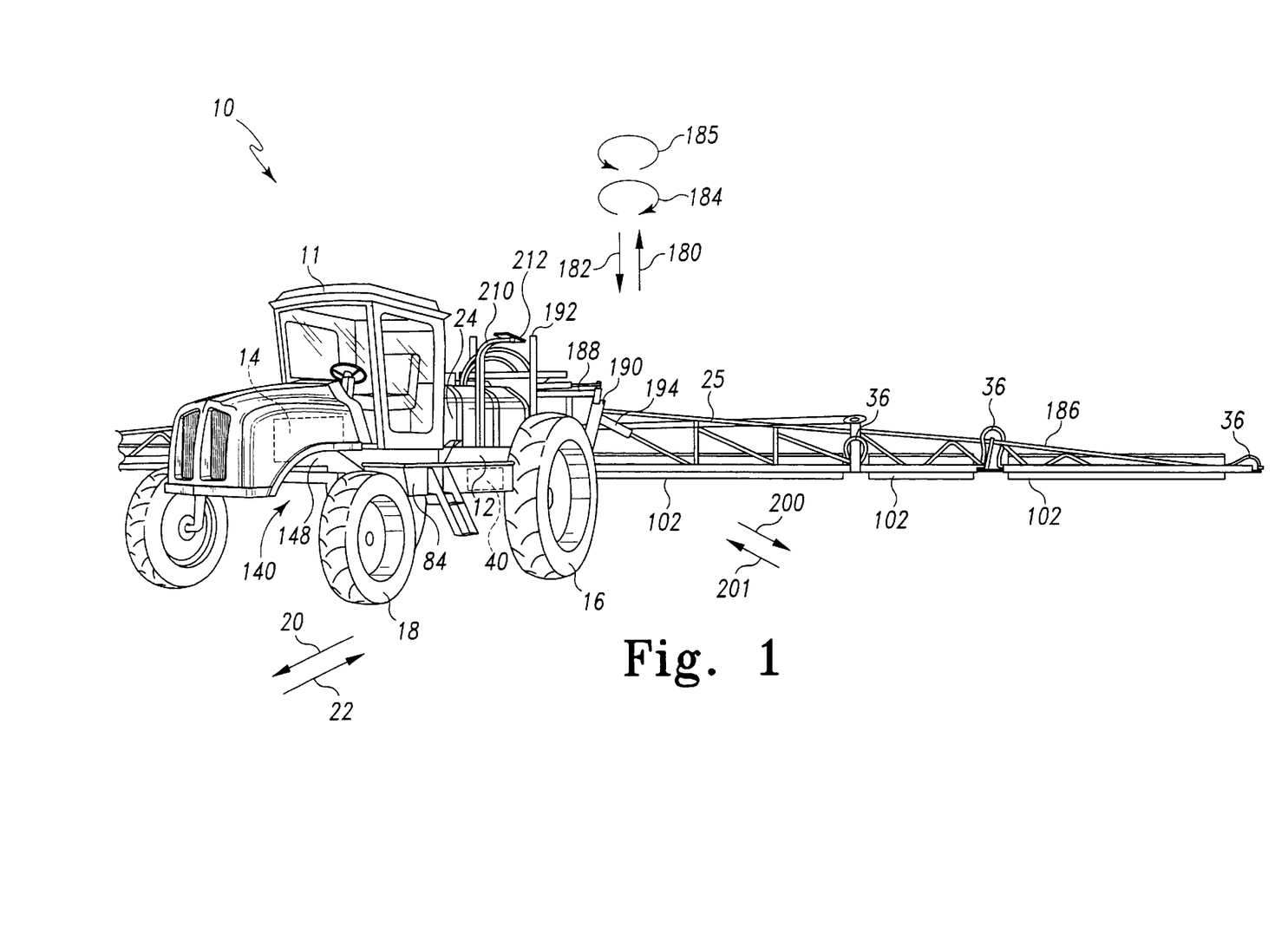
FIG. 1 is a perspective view of a crop sprayer which incorporates the features of the present invention therein.

Referring now to FIG. 1, there is shown a crop sprayer 10. The crop sprayer 10 includes a chassis 12. The chassis 12 is a support frame that spans most of the length of the crop sprayer 10 and provides a structure for mounting other components of the crop sprayer 10 thereon. The crop sprayer 10 includes a cab 11 mounted on the chassis 12. The cab 11 houses an operator and a number of controls of the crop sprayer 10.

An engine 14 is mounted on a forward portion of the chassis 12 in front of the cab 11. The engine 14 is a diesel engine which is commercially available from Cummins Engine Co. Inc., of Columbus, Ind. as model 4BT.

The chassis 12 is supported by a pair of rear wheels 16 and a pair of front wheels 18. The rear wheels 16 are driven by the engine 14 so as to propel the crop sprayer 10 in the general direction of arrows 20 and 22. In particular, the engine 14 generates mechanical energy which is transferred to the rear wheels 16 by a transmission (not shown), drive shaft (not shown), and rear differential (not shown). The front wheels 18 are operable to steer the crop sprayer 10.

The crop sprayer 10 further includes a storage tank 24 which stores diluted chemicals, such as herbicides, pesticides, and fertilizers to be sprayed on a field. The storage tank 24 is mounted on the chassis 12, aft of the cab 11.

The crop sprayer 10 further includes a boom arm 25 which is operable to distribute the chemicals over a wide swath in a field. In particular, the diluted chemicals are distributed by a number of nozzles 38 (shown in FIG. 2) which are spaced along the boom arm 25 through which the diluted chemicals are sprayed through the nozzles 38 as the crop sprayer 10 is propelled in the general direction of arrows 20 and 22.

Figure 2:
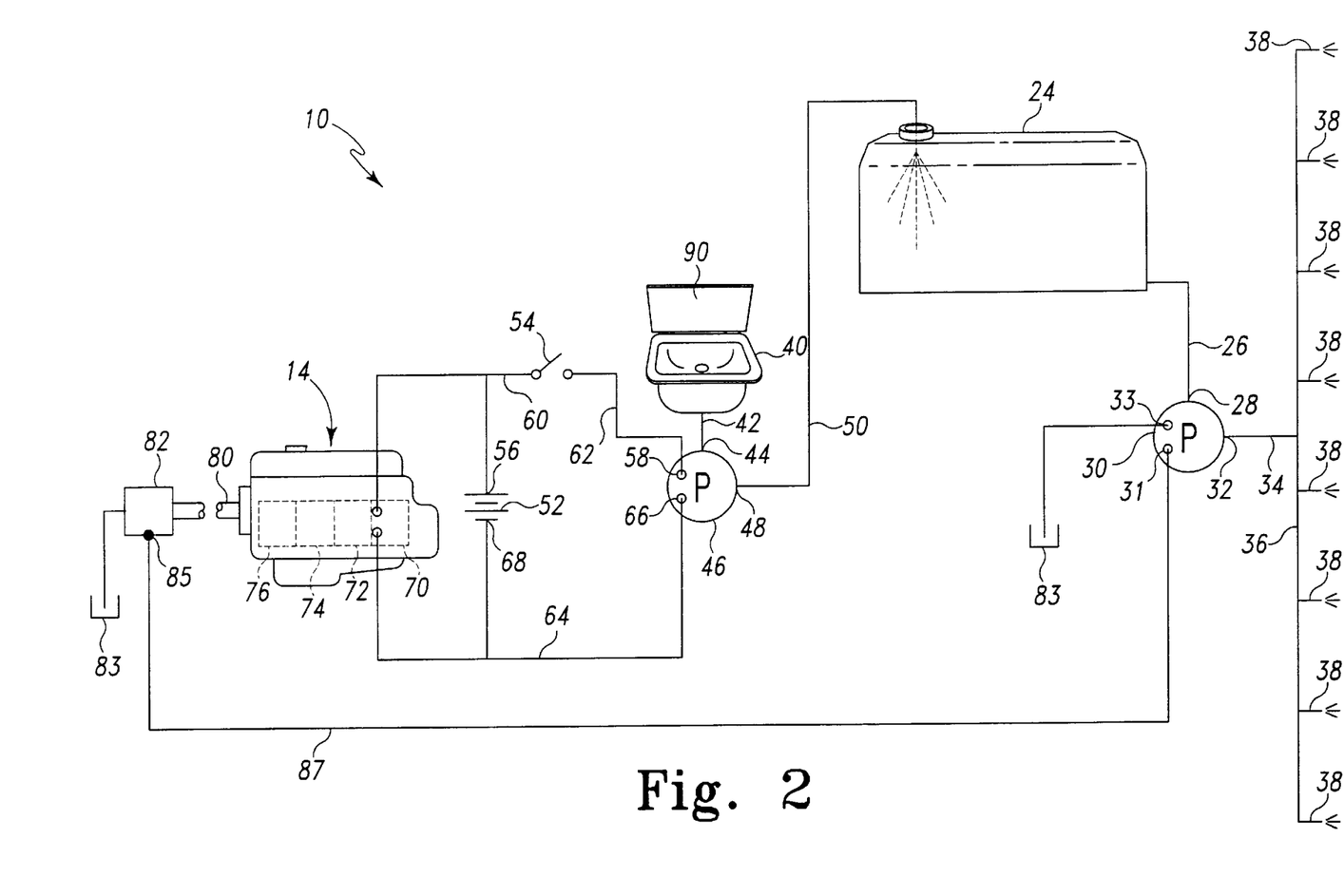
FIG. 2 is a schematic view of the crop sprayer of FIG. 1.

Referring now to FIG. 2, there is shown a schematic of the crop sprayer 10. The storage tank 24 is in fluid communication with a first sprayer conduit 26. The first sprayer conduit 26 is further in fluid communication with an inlet 28 of a sprayer pump 30. An outlet 32 of the sprayer pump 30 is in fluid communication with a second sprayer conduit 34. The second sprayer conduit 34 is in fluid communication with a spray bar 36.

The sprayer pump 30 is powered by a hydraulic pressure source, such as a hydraulic pump 82. The hydraulic pump 82 draws low pressure hydraulic fluid from a hydraulic fluid sump 83. The hydraulic fluid is then compressed and advanced from a high pressure outlet 85 of the hydraulic pump 82 as high pressure hydraulic fluid. A high pressure line 87 is in fluid communication with the high pressure outlet 85. The high pressure hydraulic fluid is then supplied to various systems of the crop sprayer 10, such as the sprayer pump 30, via the high pressure line 87. In particular, the sprayer pump 30 receives high pressure hydraulic fluid from the high pressure line 87 via a hydraulic inlet 31. The high pressure hydraulic fluid powers the spray pump 30 thereby reducing the pressure of the hydraulic fluid. The reduced pressure hydraulic fluid is then exhausted via a hydraulic outlet 33 and returned to the hydraulic sump 83.

When the sprayer pump 30 is actuated, diluted chemicals from the storage tank 24 are advanced from the storage tank 24 to the inlet 28 of the sprayer pump 30. The diluted chemicals are then advanced from the outlet 32 of the sprayer pump 30 to the second sprayer conduit 34.

From the second sprayer conduit 34, the diluted chemicals are advanced to the spray bar 36. The spray bar 36 has the nozzles 38 spaced along the length thereof. The nozzles 38 allow the diluted chemicals to be advanced from the spray bar 36 to the field which lies below the nozzles 38.

Thus, actuation of the sprayer pump 30 advances diluted chemicals from the storage tank 24 to the field via a fluid path that includes the first sprayer conduit 26, the sprayer pump inlet 28, the sprayer pump outlet 32, the second sprayer conduit 34, the spray bar 36, and the nozzles 38.

The crop sprayer 10 further includes a chemical receptacle 40. The chemical receptacle 40 is advantageously configured to receive and temporarily hold concentrated chemicals such as herbicides, pesticides, and fertilizers therein. These chemicals are distributed as concentrated chemicals from the manufacturer in order to reduce the weight and bulk of the chemicals. The reduced weight and bulk decreases the cost of transporting the chemicals from the manufacturing site to the field. However, the concentrated chemicals must be diluted prior to being sprayed onto the field.

The chemical receptacle 40 is in fluid communication with a first loading conduit 42. The first loading conduit 42 is further in fluid communication with an inlet 44 of an electric pump 46. An outlet 48 of the electric pump 46 is in fluid communication with a second loading conduit 50. The second loading conduit 50 is in fluid communication with the storage tank 24.

The electric pump 46 is an electrically powered centrifugal pump. One centrifugal pump which may be used with the present invention is commercially available from Hypro Inc. of New Brighton, Minn. as model number 9700B.

Activation of the electric pump 46 advances concentrated chemicals from the chemical receptacle 40 to the storage tank 24 via a fluid path that includes the first loading conduit 42, the electric pump inlet 44, the electric pump outlet 48, and the second loading conduit 50.

The electric pump is electrically powered by a battery 52. In particular, a first actuation of a switch 54 electrically connects a node 56 of the battery 52 to a node 58 of the pump 46. Connecting the node 56 to the node 58 allows current to flow from the battery 52, along a line 60, and along a line 62 to the electric pump 46. The circuit is completed by a line 64 which connects a node 66 of the electric pump 46 to a node 68 of the battery 52. Thus, the first actuation of switch 54 activates the electric pump 46.

A second actuation of the switch 54 disconnects node 56 from node 58 and isolates the electric pump 46 from the battery 52. Thus, the second actuation of switch 54 deactivates the electric pump 46.

The battery 52 is further electrically coupled to a number of components associated with the engine 14. In particular, the engine 14 includes a fuel injector 70 for pressurizing fuel prior to injecting the fuel into a combustion chamber (not shown), an engine control module 72 for controlling various engine components such as the fuel injector 70, a fuel pump 74 for advancing fuel from a fuel tank (not shown) to the combustion chamber, and an alternator 76 which converts mechanical energy from the engine 14 to electrical energy which is used to charge the battery 52. Each of these components is electrically coupled to the battery 52.

The engine 14 further includes a crankshaft 80. The energy generated by the combustion of fuel in the combustion chamber is converted into rotational energy of the crankshaft 80. The crankshaft 80 is mechanically coupled to the hydraulic pump 82. The hydraulic pump 82 supplies pressurized hydraulic fluid to a number of systems on the crop sprayer 10. For example, pressurized hydraulic fluid is used to manipulate the boom arm 26, steer the front wheels 18, and power the sprayer pump 30.

It should be appreciated that the engine 14 can either be in an off mode or a running mode. In the off mode, the engine 14 combusts no fuel in the combustion chamber and produces no mechanical energy. In the running mode, the engine 14 combusts fuel in the combustion chamber and produces mechanical energy in the form of rotational energy of the crankshaft 80. Due to the small volume of concentrated chemicals in the chemical receptacle 40, the electric pump 46 can be activated while the engine 14 is in the off mode as well as the running mode. In particular, because the electric pump 46 draws power directly from the battery 52, the engine 14 does not have be in the running mode to power the electric pump 46. However, systems that are powered by pressurized hydraulic fluid provided by the hydraulic pump 82, such as the sprayer pump 30, only function when the engine 14 is in the running mode. Hence, to operate such systems, the engine 14 must be in the running mode in order to supply mechanical energy to the hydraulic pump 82 via the crankshaft 80.

The crankshaft 80 is also mechanically coupled to the alternator 76. The alternator 76 converts the rotational energy of the crankshaft 80 into electrical energy. This electrical energy is then used to recharge the battery 52 when the engine 14 is in the running mode.

To operate the crop sprayer 10, the storage tank 24 is filled with a quantity of water. The concentrated chemicals in the form of a concentrated chemical solution are then placed in the chemical receptacle 40. The switch 54 is then actuated a first time so to electrically couple the electric pump 46 to the battery 52. Electrical current from the battery 52 activates the electric pump 46 so as to advance the concentrated chemicals from the chemical receptacle 40, through the first loading conduit 42, through the electric pump inlet 44, through the electric pump outlet 48, through the second loading conduit 50, and into the storage tank 24.

Once the concentrated chemicals have been advanced to the storage tank 24, the concentrated chemicals and the water become commingled. The commingling of the concentrated chemicals and water forms a diluted chemical solution in the storage tank 24.

After the concentrated chemicals have been advanced to the storage tank 24, the switch 54 is actuated a second time. The second actuation of the switch 54 deactivates the electric pump 46 so as to prevent further advancement of the concentrated chemicals to the storage tank 24.

To advance the diluted chemicals to the field, the sprayer pump 30 is actuated. Since the sprayer pump 30 is powered by pressurized hydraulic fluid supplied by the hydraulic pump 82, the engine 14 must be in the running mode. Once actuated, the sprayer pump 30 advances the diluted chemicals from the storage tank 24 to the spray bar 36. From the spray bar 36, the diluted chemicals are advanced through the nozzles 38 onto the field.

It should be appreciated that to spread the diluted chemicals over the field, the crop sprayer 10 must be moving in the general direction of arrows 20 or 22 of FIG. 1 while the diluted chemicals are advanced through the nozzles 38 onto the field. It should further be appreciated that the operator in the cab 11, controls the actuation of the sprayer pump 30 and the movement of the crop sprayer 10.

Pontoon Structures

Figure 3:
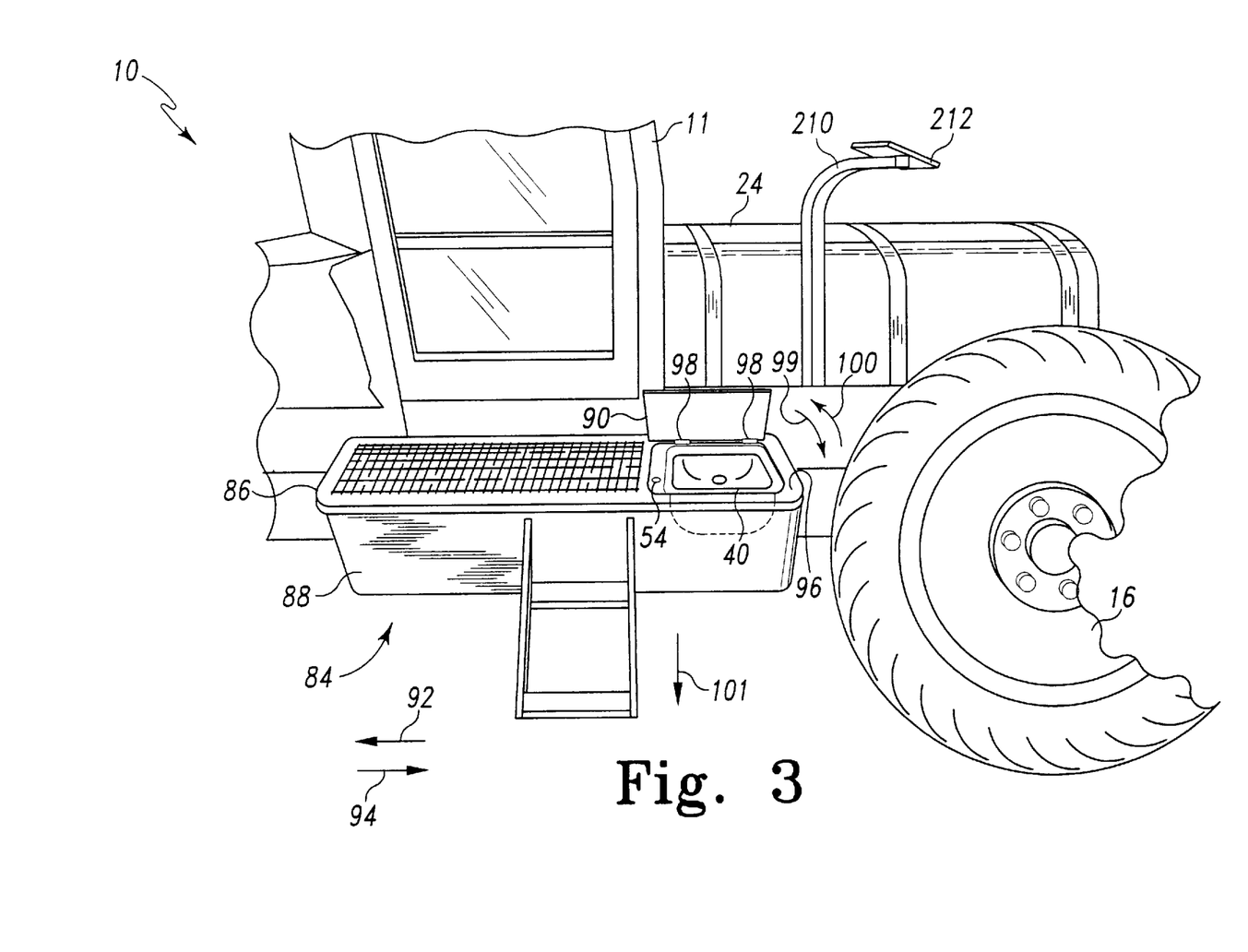
FIG. 3 is an enlarged side elevational view of the crop sprayer of FIG. 1 showing the chemical receptacle in greater detail.

Referring now to FIG. 3, there is shown an enlarged side elevational view of the crop sprayer 10 of FIG. 1. The crop sprayer 10 includes a pontoon structure 84. In particular, a frame 96 of the pontoon structure 84 is secured to the chassis 12 of the crop sprayer 10. The pontoon structure 84 includes of an upper surface 86 and a fairing or protective covering 88. The upper surface 86 can be used as a walking surface which allows the operator to walk in the general directions of arrows 92 and 94 on top of the pontoon structure 84.

The fairing 88 is operable to isolate any one of a number of components that may be secured to the chassis 12 from physical contact with the operator of the crop sprayer 10. These components may include a fuel tank, a hydraulic fluid reservoir, or other items commonly mounted to the chassis 12 of a crop sprayer 10. In addition, the fairing 88 is operable to hide these components from the operator's view so as to create a more aesthetically pleasing appearance for the crop sprayer 10.

The chemical receptacle 40 is integrated into the pontoon structure 84. In particular, the upper surface 86 of the pontoon structure 84 includes a door 90. The door 90 is pivotally secured to the frame 96 of the pontoon structure 84 by a pair of hinges 98 such that the door 90 is free to pivot relative to the frame 96 in the general directions of arrows 99 and 100. The chemical receptacle 40 is supported by the frame 96. In addition, the switch 54 is secured to the frame 96 proximate to the chemical receptacle 40. It should be noted that the chemical receptacle 40 occupies a portion of the interior space defined by the pontoon structure 84.

In operation, when it is desirable to advance concentrated chemicals from the chemical receptacle 40 to the storage tank 24, the door 90 is rotated relative to the frame 96 in the general direction of arrow 100 to an open position, as shown in FIG. 3. The concentrated chemicals are poured into the chemical receptacle 40. The pontoon structure 84 is advantageously configured to allow the operator of the crop sprayer 10 to pour the concentrated chemicals into the chemical receptacle 40 when the operator is standing on the ground.

To activate the electric motor 46, the switch 54 is actuated a first time by pressing the switch 54 in the general direction of arrow 101. The electric pump 46 then advances the concentrated chemicals from the chemical receptacle 40 to the storage tank 24 as described above. To deactivate the electric motor 46, the switch 54 is actuated a second time by pressing the switch 54 in the general direction of arrow 101. Deactivating the electric pump 46 prevents the advancement of concentrated chemicals from the chemical receptacle 40 to the storage tank 24.

After the concentrated chemicals have been advanced to the storage tank 24, the door 90 is pivoted relative to the frame 96 in the general direction of arrow 99 until the door 90 is positioned in the closed position whereby the door 90 covers the opening of the chemical receptacle 40. In the closed position, the door 90 lies in the same plane as the upper surface 86 thereby allowing the door 90 to be used as a walking surface. In addition, when the door 90 is in the closed position, the door 90 prevents objects from entering the chemical receptacle 40. Furthermore, in the closed position, the door 90 prevents inadvertent actuation of the switch 54.

Spray Bar Mounting Brackets

Figure 4A:
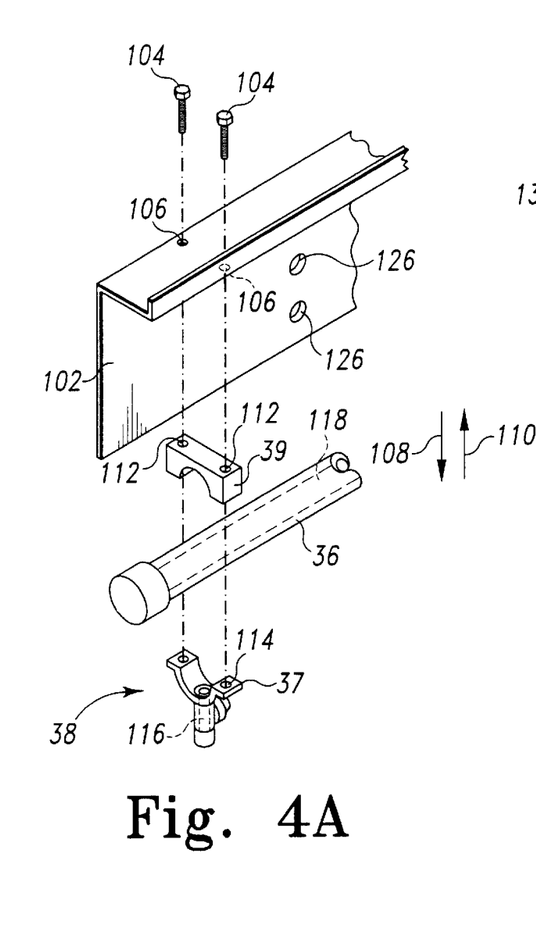
FIG. 4A is an enlarged and exploded view of the mounting bracket used to mount the nozzles on the crop sprayer of FIG. 1.
Figure 4B:
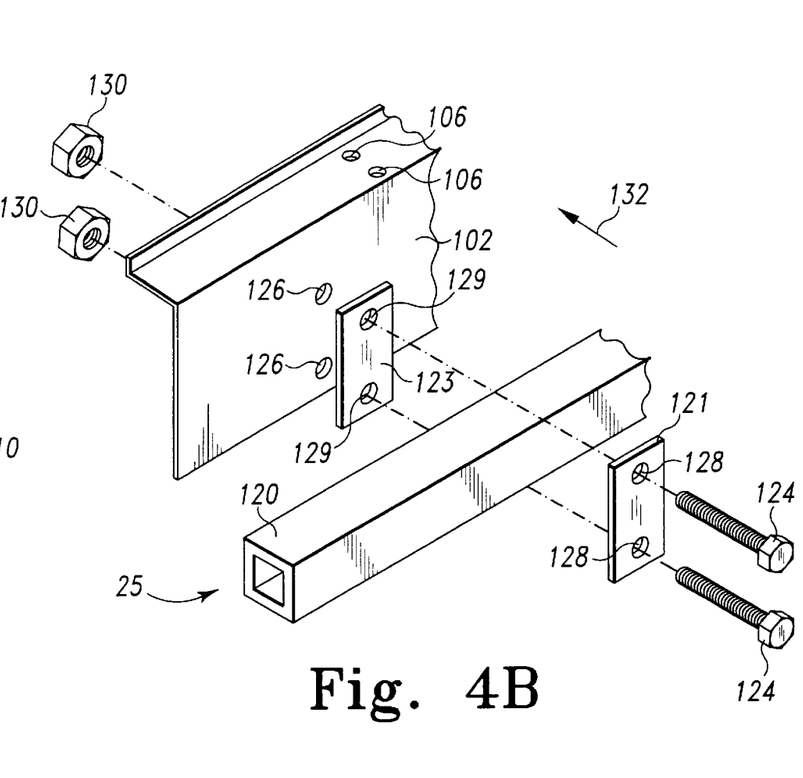
FIG. 4B is another enlarged and exploded view of the mounting bracket of FIG. 4A, but showing an opposite side thereof.
Figure 4C:
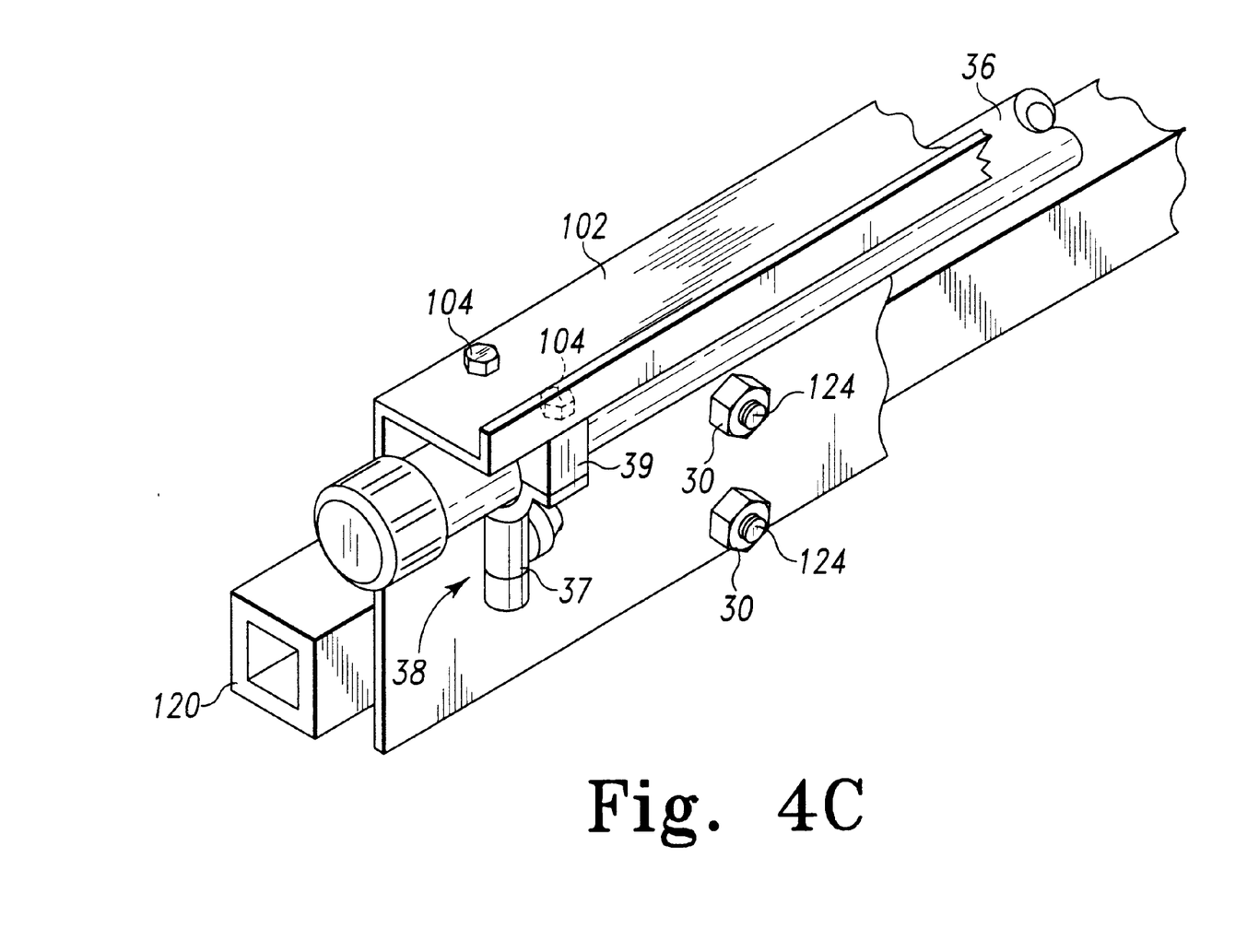
FIG. 4C is a perspective view of the assembled mounting bracket of FIG. 4C, note the mounting bracket is attached to the boom arm.

Referring now to FIGS. 4A and 4B, there is shown a mounting bracket 102 used to secure the spray bar 36 to the boom arm 25. The mounting brackets 102 are positioned in an aligned orientation along the boom arm 25 as shown in FIG. 1.

FIG. 4A shows the mounting bracket 102 as viewed from a position behind the crop sprayer 10 looking in the general direction of arrow 20 of FIG. 1. The spray bar 36 is secured to the mounting bracket 102 by a pair of bolts 104, which are received through holes 106 defined in the mounting bracket 102. The bolts 104 secure the nozzle 38 to the mounting bracket 102. In particular, the nozzle 38 includes a tip portion 37 and a base portion 39. To assemble the nozzle 38, the spray bar 36 is interposed between the tip portion 37 and the base portion 39. The bolts 104 are received through a respective hole 106 in the mounting bracket 102, through a respective aperture 112 in the base portion 39, and into a respective threaded aperture 114 in the tip portion 37. As the bolts 104 are rotatably advanced in the general direction of arrow 108, the spray bar 36 is compressed between the base portion 39 and the tip portion 37 of the nozzle 38. As the spray bar 36 is compressed, an upwardly projecting annular member (not shown) of the tip portion 37 punctures the spray bar 36 so as to place an outlet 116 of the nozzle 38 in fluid communication with an interior passage 118 of the spray bar 36. When the spray pump 30 is actuated, the diluted chemicals are advanced from the storage tank 24 to the field via the interior passage 118 of the spray bar 36 and the outlet 116 of the nozzle 38. In addition, advancement of the bolts 104 in the general direction of arrow 108 secures the spray bar 36 to the mounting bracket 102. It should be appreciated that FIG. 4A shows only one exemplary nozzle 38 of the number of nozzles 38 which are spaced along the mounting bracket 102.

FIG. 4B shows the mounting bracket 102 as viewed from a position in front of the crop sprayer looking in the general direction of arrow 22. After the spray bar 36 is secured to the mounting bracket 102 in the manner previously discussed, the mounting bracket 102 is secured to the boom arm 25. In particular, the mounting bracket 102 is secured to a boom arm member 120 by first plate 121 and a second plate 123. The first plate 121 and second plate 123 are secured to the mounting bracket 102 by a pair of bolts 124 that are received through a respective hole 128 defined in the first plate 121 and a respective hole 129 defined in the second plate 123. The bolts 124 are further received through a respective hole 126 defined in the mounting bracket 102. The bolts 124 are then threadingly engaged with a respective threaded nut 130. As the bolts 124 are advanced in the general direction of arrow 132, the first plate 121 and the second plate 123 secure the mounting bracket 102 to the boom arm member 120 of the boom arm 25.

It should be appreciated that the use of mounting brackets 102 provides protection for the nozzles 38 and the spray bar 36 during operation of the crop sprayer 10.

Offset Frame

Figure 5:
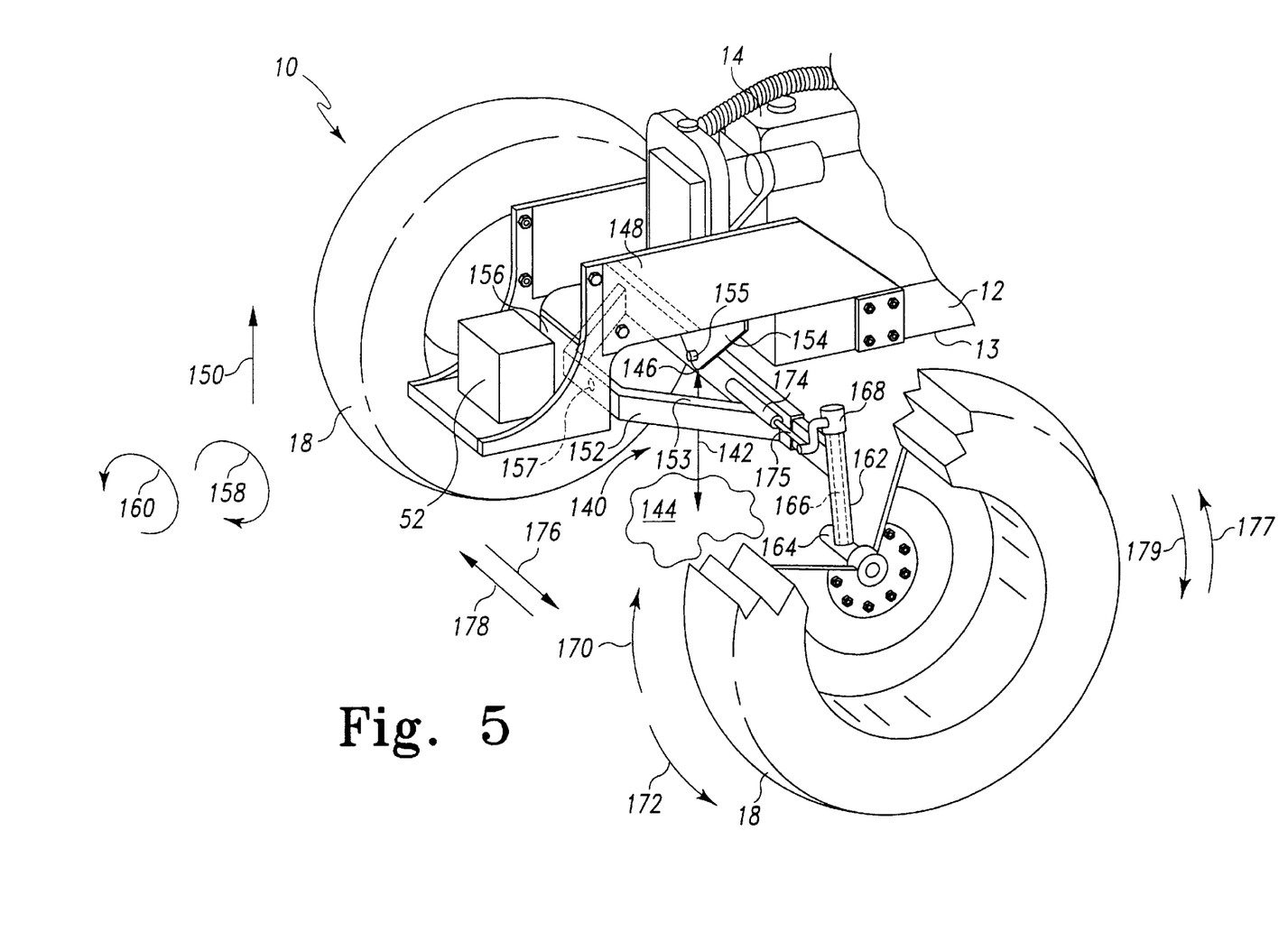
FIG. 5 is an enlarged perspective view of the front suspension of the crop sprayer of FIG. 1, note that the engine cover (i.e. hood) and a portion of a front wheel have been removed for clarity of description.

Referring now to FIG. 5, the crop sprayer 10 further includes an offset frame 148 which is secured to the chassis 12 at a location forward of the engine 14. The offset frame 148 is positioned at a location higher in the general direction of arrow 150 than the portion of the chassis 12 that supports the engine 14. A front suspension assembly 140 is mounted to the underside of the offset frame 148. The front suspension assembly 140 includes a generally "A" shaped frame 152 pivotally coupled to the offset frame 148. In particular, a pin 155 pivotally couples the frame 152 to a bracket 154 mounted to an underside of the offset frame 148 whereas a pin 157 pivotally couples the frame 152 to a front plate 156 secured to a front of the offset frame 148. The pins 155 and 157 allow the frame 152 to pivot relative the offset frame 148 in the general directions of arrows 158 and 160. A top surface 153 of the frame 152 is located at a first vertical height above the ground 144. The bottom surface 13 of the chassis 12 is located at a second vertical height above the ground. It should be appreciated that the first vertical height is greater than the second vertical height. This feature provides for enhanced ground (or crop) clearance 142 as will be discussed below.

The left side of the front suspension 140 further includes a suspension arm 162 secured to the frame 152. An axle 164 is positioned at the lower end of the arm 162, and a steering lever 168 is positioned at an upper end of the suspension arm 162. The axle 164 allows the wheel 18 to rotate relative to the chassis 12 in the general direction of arrows 177 and 179. A steering member 166 connects the steering lever 168 and the axle 164. In particular, rotation of the steering lever 168 in the general direction of arrow 170, causes the steering member 166 and the axle 164 to rotate relative to the suspension arm 162 in the general direction of arrow 170. On the other hand, rotation of the steering lever 168 in the general direction of arrow 172, causes the steering member 166 and the axle 164 to rotate relative to the suspension arm 162 in the general direction of arrow 172.

A steering cylinder 174 is operative to rotate the steering lever 168 in the general directions of arrows 170 and 172. The steering cylinder 174 is powered by pressurized hydraulic fluid from the hydraulic pump 82 (shown in FIG. 2). In particular, when a rod 175 of the steering cylinder 172 is extended in the general direction of arrow 176, the steering lever 168, and thus the axle 164, is rotated in the general direction of arrow 172. On the other hand, when a rod 175 of the steering cylinder 172 is retracted in the general direction of arrow 178, the steering lever 168, and thus the axle 164 is rotated in the general direction of arrow 170.

It should be appreciated that the front suspension 140 further includes a suspension arm, axle, steering lever, steering member, and steering cylinder attached to the right side of the frame 152 substantially identical to the components attached to the left side of the frame 152.

The ground clearance 142 of the crop sprayer 10 is the distance between the ground 144 and the lowest point 146 of the crop sprayer 10. Typically, the lowest point of crop sprayers which have heretofore been designed is at the bottom of a frame analogous to the frame 152 of the crop sprayer 10. An objective in the design of any crop sprayer is to increase the ground clearance 142 so as to allow the crop sprayer 10 to move through a field while minimizing damage to the crops. A disadvantage of increasing the ground clearance 142 is that increasing the ground clearance 142 usually raises the center of gravity of the crop sprayer 10 which decreases the stability of the crop sprayer 10.

It should be appreciated that mounting the front suspension 140 to the offset frame 148 allows the ground clearance 142 to be increased without increasing the height of the engine 14, cab 11, storage tank 24, and other heavy components of the crop sprayer 10. Thus, the use of the offset frame 148 allows the ground clearance 142 to be increased without significantly increasing the center of gravity of the crop sprayer 10. Hence, the crop sprayer 10 has the advantage of increased ground clearance 142 without the disadvantage of raising the center of gravity of the crop sprayer 10.

Rear Boom Support

Figure 6A:
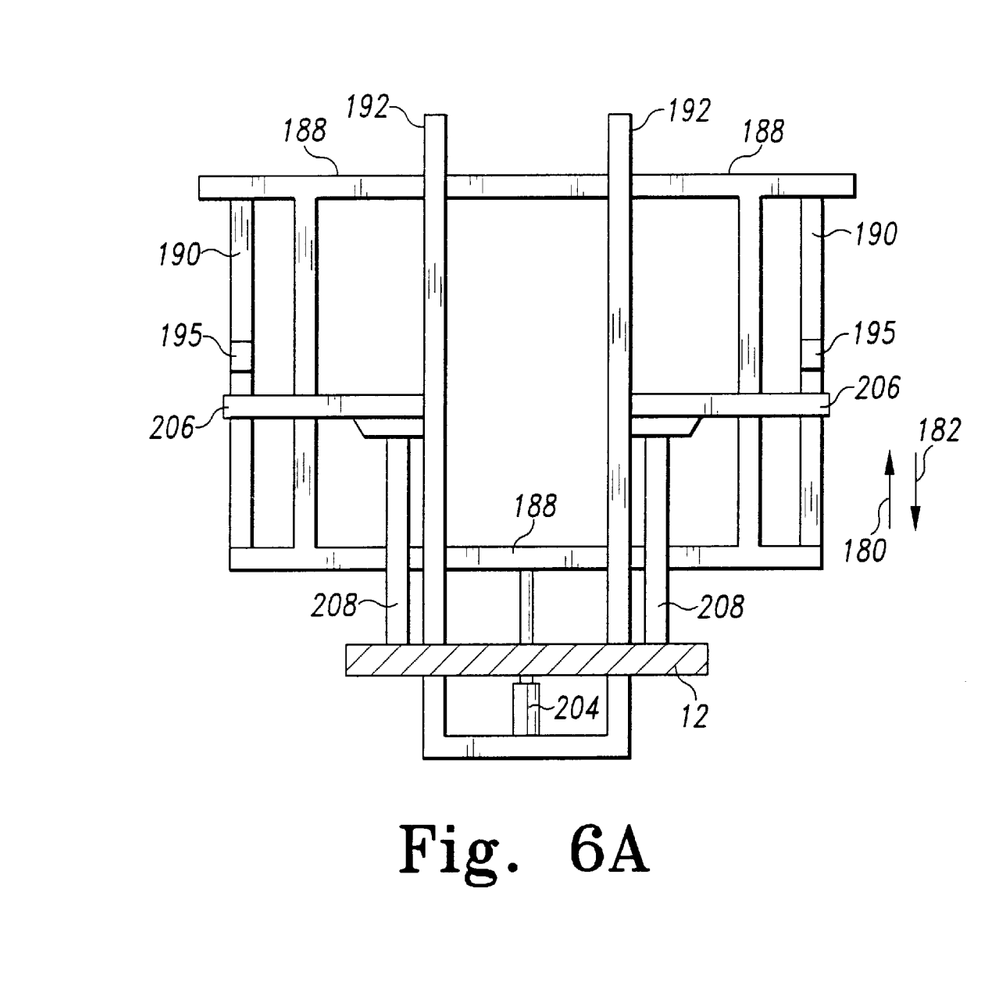
FIG. 6A is a front elevational view of a lift frame and a boom frame viewed from the line 6A—6A of FIG. 7A, as viewed in the direction of the arrows.

Referring now to FIG. 6A, a lift frame 192 is secured to the chassis 12. A boom frame 188 is slidingly attached to the lift frame 192 such that the boom frame 188 is operable to slide up in the general direction of arrow 180 relative to the lift frame 192, and down in the general direction of arrow 182 relative to the lift frame 192. A lift cylinder 204 is interposed between the a lower portion of the lift frame 192 and the boom frame 188. Hydraulic pressure from the hydraulic pump 82 (shown in FIG. 2) is supplied to the lift cylinder 204. As the lift cylinder 204 is extended, the boom frame 188 slides upwardly in the general direction of arrow 180 relative to the lift frame 192. On the other hand, as the lift cylinder 204 is retracted, the boom frame 188 slides downwardly in the general direction of arrow 182 relative to the lift frame 192.

The lift frame 192 includes a pair of rear boom supports 206 which extend radially outward from the lift frame 192. Each of the rear boom supports 206 is further supported by a support beam 208 which is interposed between the rear boom support 206 and the chassis 12. The support beam 208 provides additional structural support for loads that are applied to the rear boom supports 206 in the general direction of arrow 182.

Figure 6B:
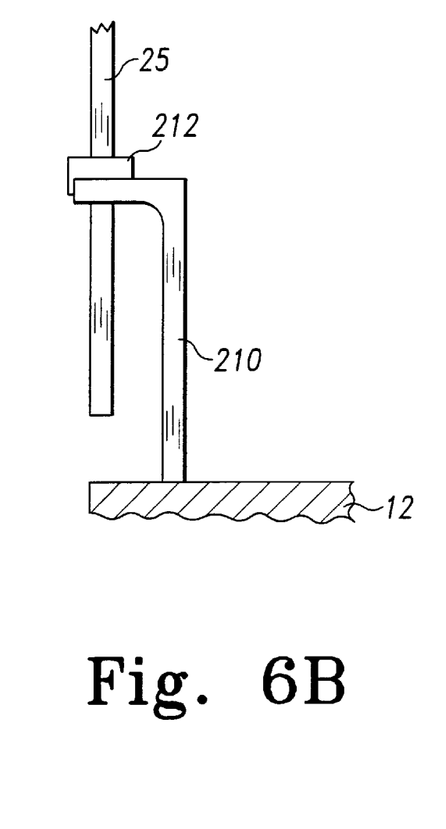
FIG. 6B is a fragmentary front elevational view of the front boom support and the boom arm viewed from the line 6B—6B of FIG. 7A, as viewed in the direction of the arrows.

Referring now to FIG. 6B, a front boom support 210 is secured to the chassis 12 of the crop sprayer 10. A plate 212 is secured to the upper portion of the front boom support 210. The front boom support 210 and the plate 212 are advantageously configured to support a front portion of the boom arm 25 as shown in FIGS. 6B and 6C.

Figure 7A:
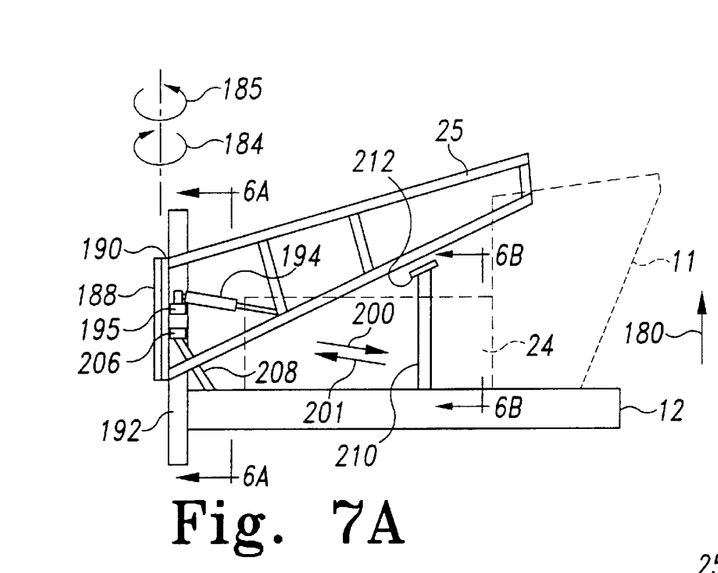
FIG. 7A is a fragmentary side elevational view of the chassis and boom arm of the crop sprayer of FIG. 1 with the boom arm shown positioned above the front boom support, note that the cab and storage tank are shown in phantom and a tip portion of the boom arm has been omitted for clarity of description.

Referring to FIG. 7A, the boom arm 25 is pivotally secured to the boom frame 188 at a pivot joint 190. Note that a tip portion 186 (see FIG. 1) of the boom arm 25 is not shown in FIGS. 6A, 6B, and 6C for clarity of description. The pivot joint 190 allows the boom arm 25 to pivot relative to the boom frame 188 in the general direction of arrows 184 and 185. A pivot cylinder 194 is operative to move the boom arm 25 in the general direction of arrows 184 and 185 relative to the boom frame 188. Hydraulic pressure from the hydraulic pump 82 (shown in FIG. 2) is supplied to the pivot cylinder 194. In particular, as the pivot cylinder 194 is extended in the general direction of arrow 200, the boom arm 25 is pivoted in the general direction of arrow 184 relative to the boom frame 188. Conversely, as the pivot cylinder 194 is retracted in the general direction of arrow 201, the boom arm 25 is pivoted in the general direction of arrow 185 relative to the boom frame 188. The cylinder 194 is attached to the boom frame 188 at a cylinder bracket 195.

The boom arm 25 is shown positioned in a retracted position in FIG. 7A. To move from the extended position (shown in FIG. 1) to the retracted position (shown in FIG. 7A), the boom arm 25 is first raised in the general direction of arrow 180, then pivoted in the general direction of arrow 185. The lift cylinder 204 is extended to raise the boom arm 25 in the general direction of arrow 180, and the pivot cylinder 194 is retracted to pivot the boom arm 25 in the general direction of arrow 185.

The boom arm 25 is supported by the boom frame 188, which in turn is supported by the lift cylinder 204. The lift cylinder 204 supports the boom arm 25 with pressurized hydraulic fluid from the hydraulic pump 82. In particular, changes in the volume of hydraulic fluid contained in the lift cylinder 204 extends and retracts the lift cylinder 204 so as to move the lift frame 188.

Figure 7B:
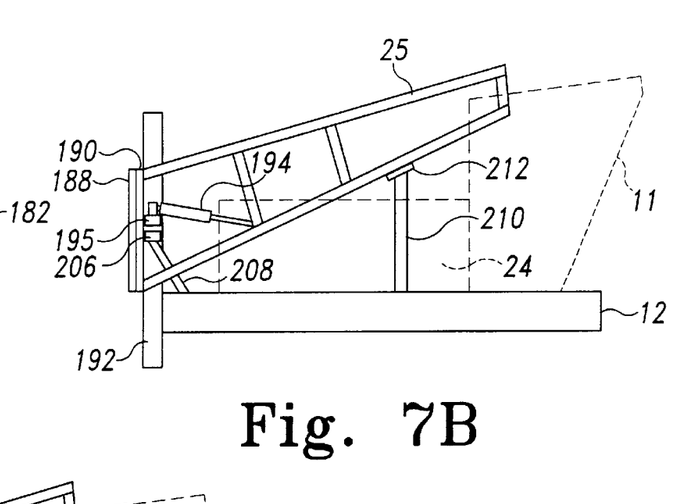
FIG. 7B is view similar to FIG. 7A, but showing the boom arm resting on a front boom support but positioned above the rear boom support.

Referring now to FIG. 7B, to position the boom arm 25 on the front boom support 210, the boom arm 25 must be lowered in the general direction of arrow 182. In particular, the lift cylinder 204 (shown in FIG. 6A) is retracted so as to lower the boom frame 188, which in turn lowers the boom arm 25. The lift cylinder 204 is retracted until the boom arm 25 comes into contact with the plate 212 secured to the front boom support 210. It should be appreciated that when the boom arm 25 is positioned in the position shown in FIG. 7B, the boom arm 25 is partially supported by the front boom support 210 and partially supported by the lift cylinder 204.

Figure 7C:
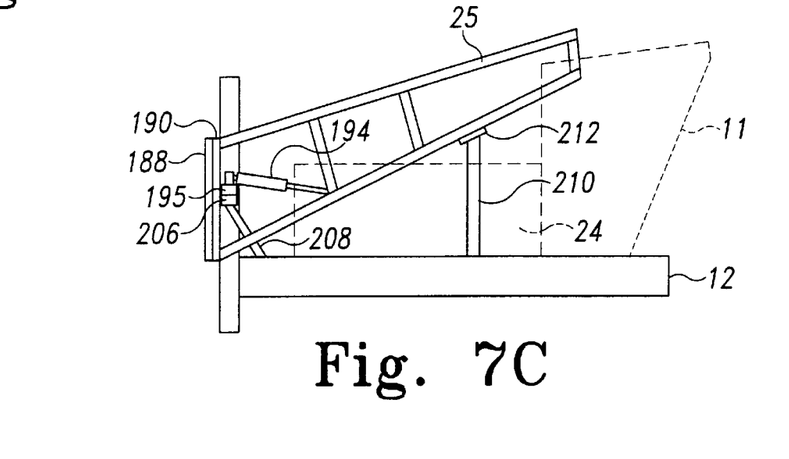
FIG. 7C is view similar to FIG. 7A, but showing the boom arm resting on both the front boom support and the rear boom support.

Referring now to FIG. 7C, to support the boom arm 25 with the rear boom support 206, the lift cylinder 204 is retracted until the cylinder bracket 195 rests on the rear boom support 206. It should be appreciated that when the boom arm 25 is positioned in the position shown in FIG. 7C, the boom arm 25 is supported by the front boom support 210 and the rear boom support 206 which removes substantially all of the load of the boom arm 25 from the lift cylinder 204. Removing the load from the lift cylinder 204 allows the boom arm 25 to be supported without supplying pressurized hydraulic fluid to the lift cylinder 204. Thus, the boom arm 25 can be supported in the position shown in FIG. 7C when the engine 14 is in the off mode.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A crop sprayer, comprising:

a chassis;

a number of wheels which support said chassis;

an engine for driving at least one of said number of wheels so as to propel said chassis;

a storage tank, supported by said chassis, for storing a quantity of water therein;

a chemical receptacle, supported by said chassis, for receiving and holding a chemical solution therein;

a first loading conduit which is in fluid communication with said chemical receptacle;

a second loading conduit which is in fluid communication with said storage tank;

an electric pump having a pump inlet and a pump outlet, wherein (i) said pump inlet is coupled to said first loading conduit, (ii) said pump outlet is coupled to said second loading conduit, and (iii) operation of said electric pump causes said chemical solution to be advanced from said chemical receptacle to said storage tank through said first loading conduit and said second loading conduit, whereby said chemical solution becomes commingled with said water in said storage tank so as to create a diluted chemical solution in said storage tank;

a battery electrically coupled to said electric pump for powering said electric pump;

a sprayer conduit in fluid communication with said storage tank; and sprayer pump for causing said diluted chemical solution to be advanced out of said storage tank through said sprayer conduit and onto a field.

2. The crop sprayer of claim 1, further comprising an alternator which is mechanically coupled to said engine, wherein:

said engine has a running mode and an off mode, and said alternator is electrically coupled to said battery so as to recharge said battery during said running mode.

3. The crop sprayer of claim 2, wherein said battery is electrically coupled to a number components of said engine for providing power to said number of components of said engine.

4. The crop sprayer of claim 1, wherein operation of said electric pump further causes said chemical solution to be advanced into said pump inlet and out of said pump outlet.

5. The crop sprayer of claim 1, wherein:

said engine has a running mode and an off mode, and said battery supplies power to said electric pump during said off mode of said engine so as to operate said electric pump to advance chemical solution from said chemical receptacle to said storage tank during said off mode of said engine.

6. A method of operating a crop sprayer having (i) a chassis, (ii) a number of wheels which support the chassis, (iii) an engine for driving at least one of the number of wheels so as to propel the chassis, (iv) a storage tank supported by the chassis, (v) a chemical receptacle supported by the chassis, (vi) a first loading conduit which is in fluid communication with the chemical receptacle, (vii) a second loading conduit which is in fluid communication with the storage tank, (viii) an electric pump having a pump inlet and a pump outlet, wherein the pump inlet is coupled to the first loading conduit, and the pump outlet is coupled to the second loading conduit, (ix) a sprayer conduit in fluid communication with the storage tank, and (x) a sprayer pump in fluid communication with the sprayer conduit, comprising the steps of:

placing a quantity of water into the storage tank;

placing a chemical solution into the chemical receptacle;

operating the electric pump so as to cause the chemical solution to be advanced from the chemical receptacle to the storage tank through the first loading conduit and the second loading conduit, whereby the chemical solution becomes commingled with the water in the storage tank so as to create a diluted chemical solution in the storage tank;

powering the electric pump with a battery during the electric pump operating step; and operating the sprayer pump so as to cause the diluted chemical solution to be advanced out of the storage tank through the sprayer conduit and onto a field.

7. The method of claim 6, wherein (i) the crop sprayer further comprises an alternator which is mechanically coupled to the engine, and (ii) the engine has a running mode and an off mode, further comprising the step of:

recharging the battery with the alternator when the engine is in the running mode.

8. The method of claim 7, further comprising the step of powering a plurality of components of the engine with the battery.

9. The method of claim 6, wherein the electric pump operating step further includes the step of advancing the chemical solution into the pump inlet and out of the pump outlet.

10. The method of claim 6, wherein:

the engine has a running mode and an off mode, and the electric pump powering step occurs when the engine is in the off mode.

* * * * *